Aug. 9, 1932.                 B. McCORMICK                    1,870,292
                           DYNAMO ELECTRIC MACHINE
                              Filed Nov. 5, 1931
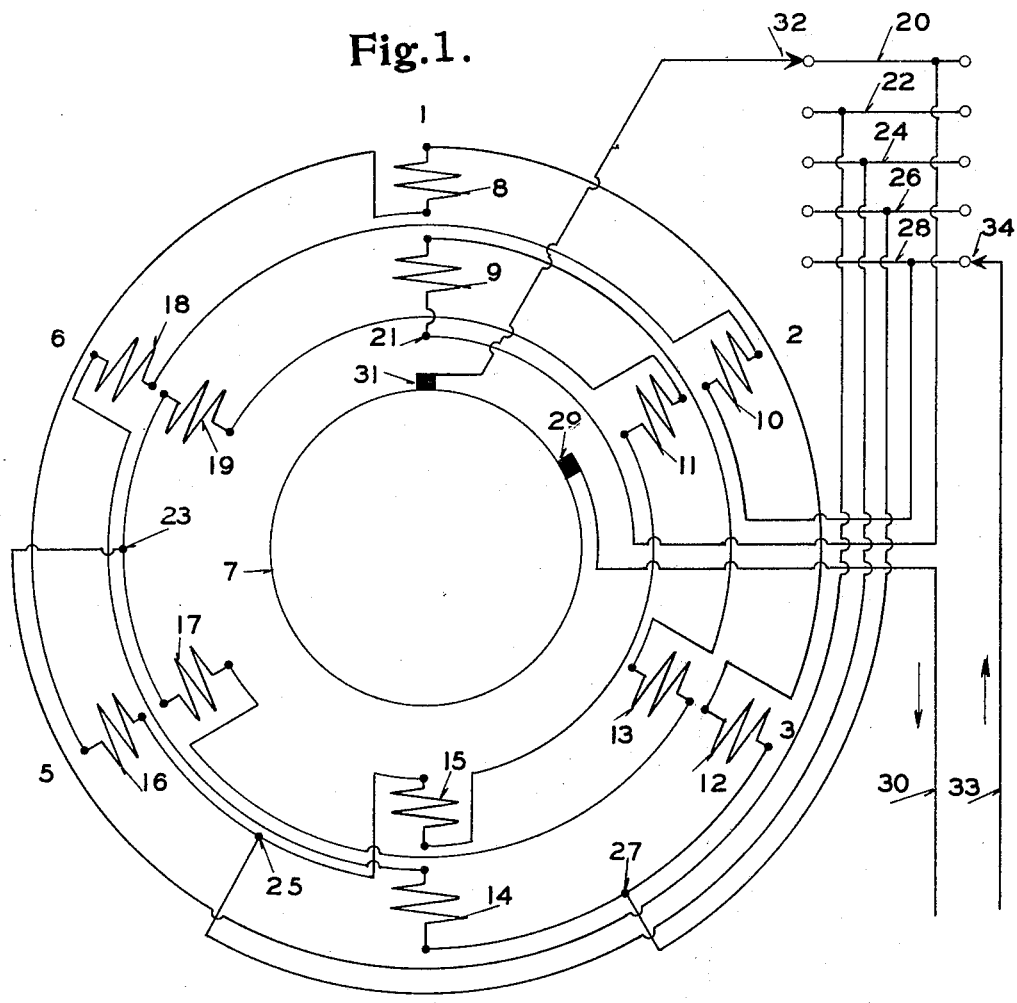
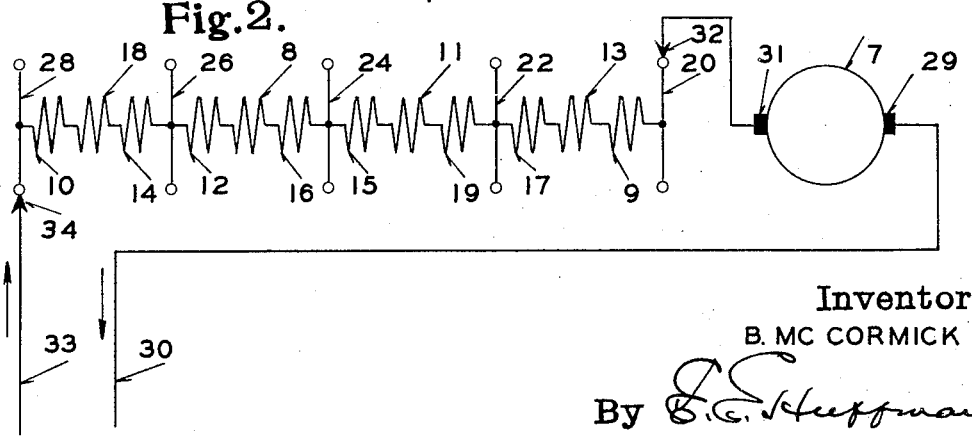
Inventor
B. MC CORMICK Patented Aug. 9, 1932

1,870,292

UNITED STATES PATENT OFFICE

BRADLEY McCORMICK, OF ST. LOUIS, MISSOURI, ASSIGNOR TO WAGNER ELECTRIC CORPORATION, OF ST. LOUIS, MISSOURI, A CORPORATION OF DELAWARE

DYNAMO ELECTRIC MACHINE

Application filed November 5, 1931. Serial No. 573,043.

My invention relates to dynamo electric machines, one of its objects being to provide an improved arrangement of field coils and connections for increasing, decreasing, and reversing the field of the machine by a simple switching operation without affecting the symmetry of the magnetic circuit. My invention is particularly useful in electrical transmissions of the type embodying a dynamo electric machine required to operate at times as a motor and at other times as a generator with variable field in each instance.

Other objects of my invention will become apparent from the following description taken in connection with the accompanying drawing in which Figure 1 is a diagrammatic representation of a dynamo electric machine embodying my invention; and Figure 2 is a simplified diagrammatic representation of the field coils and switching arrangement shown in Figure 1.

Numerals 1, 2, 3, 4, 5, and 6 indicate the position of the poles of a 6-pole dynamo electric machine and 7 the armature therefor. The field poles are of the usual type, being formed integral with each other to produce magnetic paths between poles. Each of the field poles is provided with a pair of coils so wound that their magneto motive forces are additive and the adjacent poles are of unlike polarity. Thus pole 1 is provided with coils 8 and 9; pole 2 with coils 10 and 11; pole 3 with coils 12 and 13; pole 4 with coils 14 and 15; pole 5 with coils 16 and 17; and pole 6 with coils 18 and 19, as shown. The field coils are all connected in series in a special sequence, whereby four groups of field coils are formed, each group containing a coil on each pole of like polarity. Coils 9, 13 and 17 are, therefore, connected in series to form a first group; coils 19, 11 and 15 a second group; coils 16, 8 and 12 a third group; and coils 14, 18 and 10 a fourth group.

A special switching arrangement is provided for the series connected groups of coils, whereby any group of coils may be energized either individually or in series with any other group and the direction of current in the group or groups may be reversed to change the polarity of the poles to cause the dynamo electric machine to act either as a generator or as a motor. In accordance with this switching arrangement, I connect a contact 20 with the free end 21 of the first group of coils; a contact 22 with a tap 23 between the first and second groups of coils; a contact 24 with a tap 25 between the second and third groups of coils; a contact 26 with a tap 27 between the third and fourth groups of coils; and a contact 28 with the free end of the fourth group of coils. The brush 29 of the armature 7 is connected to one side 30 of the line and the other brush 31 is provided with a contact arm 32 for cooperation with any of the contacts. The other side of the line 33 is provided with a contact arm 34 which also may be engaged with any of the contacts.

If the current is flowing in the line as indicated by the arrows, and the contact arms 32 and 34 are in the position shown, it is seen that all of the coils are energized and the dynamo electric machine operates as a motor with a maximum field. If contact arm 32 is progressively moved from contact 20 to 28, the groups of coils are progressively "cut out" until the armature is directly across the line and no field exists. If contact arm 34 is now progressively moved from contact 28 to 20, the groups of coils are progressively "cut in" until a maximum field again exists but the polarity of poles has been reversed, thereby causing the machine to operate as a generator. It is also clear from the switching arrangement that by suitably positioning the contact arms 32 and 34, any individual group of coils may be energized separately or in series with other groups of coils, and the direction of the current flowing therethrough may be changed as desired.

The field winding and control therefor just described, have made it possible to secure nine different operating characteristics of the dynamo electric machine by the use of only two independent coils on each of the six poles as compared with the prior practice of employing four independent coils on each pole. The number of connectors is also reduced.

My invention is, of course, applicable to dynamo electric machines having a different number of poles than six, and each field pole may be provided with more than two coils.

Having fully described my invention, what I claim as new and desire to secure by Letters Patent of the United States is:

1. A dynamo electric machine having a plurality of field coils of each pole, said coils being connected to form a plurality of groups of field coils, each group consisting of a field coil of all poles of like polarity, and means for supplying current to each group of coils either individually or in series with other groups.

2. A dynamo electric machine having a plurality of field coils on each pole, said coils being connected to form a plurality of groups of field coils in series, each group consisting of a field coil of all poles of like polarity, the series connection of the groups of field coils being such that a group containing coils on poles of one polarity is connected to a group containing coils on poles of opposite polarity, and means for supplying current to said groups of coils either individually or in series.

3. A dynamo electric machine having a plurality of field coils on each pole, said coils being connected to form a plurality of groups of field coils in series, each group consisting of a field coil on each alternate pole, and means for supplying current to each group of coils either individually or in series with other groups and for reversing the direction of flow of current through said groups of coils.

4. A dynamo electric machine having a plurality of field coils on each pole, said coils being connected to form a plurality of groups of field coils in series, each group consisting of a field coil of all poles of like polarity, and switch means for connecting either of the line conductors to either end of the field winding or to any conductor joining two field groups.

5. A dynamo electric machine having a plurality of field coils for each pole, said coils being connected to form a plurality of groups of coils, each group consisting of a field coil on each alternate pole, a plurality of contact members, each group of coils being connected between a pair of contact members and said groups of coils being in series connection, and means for connecting either of the line conductors to any of said contact members.

In testimony whereof, I hereunto affix my signature, this 29th day of October, 1931.

BRADLEY McCORMICK.